United States Patent
Yang

(10) Patent No.: US 7,324,579 B2
(45) Date of Patent: Jan. 29, 2008

(54) FLEXIBLE DISTRIBUTION DEVICE AND METHOD FOR RAKE RECEIVER OF COMMUNICATION SYSTEM

(75) Inventor: Wu-Han Yang, KaoHsiung (TW)

(73) Assignee: Benq Corporation, Tao Yuan (TW)

( * ) Notice: Subject to any disclaimer, the term of this patent is extended or adjusted under 35 U.S.C. 154(b) by 754 days.

(21) Appl. No.: 10/764,573

(22) Filed: Jan. 27, 2004

(65) Prior Publication Data

US 2004/0223539 A1 Nov. 11, 2004

(30) Foreign Application Priority Data

May 6, 2003 (TW) .............................. 92112265 A

(51) Int. Cl.
*H04L 27/30* (2006.01)
(52) U.S. Cl. .................. 375/142; 375/150; 375/267; 375/343; 370/441; 370/479
(58) Field of Classification Search .............. 375/142, 375/143, 147, 150, 152, 267, 343; 370/320, 370/342, 441, 465, 479
See application file for complete search history.

(56) References Cited

U.S. PATENT DOCUMENTS

| | | | |
|---|---|---|---|
| 5,684,793 A | | 11/1997 | Kiema et al. |
| 5,809,020 A | * | 9/1998 | Bruckert et al. ............. 370/335 |
| 6,408,039 B1 | * | 6/2002 | Ito .............................. 375/347 |
| 6,529,545 B2 | * | 3/2003 | Tiirola et al. ............... 375/148 |
| 7,092,432 B2 | * | 8/2006 | Kaewell et al. ............. 375/144 |
| 7,200,133 B2 | * | 4/2007 | Lin .............................. 370/342 |

FOREIGN PATENT DOCUMENTS

CN 94192367.3 6/1996

* cited by examiner

*Primary Examiner*—Dac V. Ha
(74) *Attorney, Agent, or Firm*—Birch, Stewart, Kolasch & Birch, LLP

(57) ABSTRACT

The present invention is related to a flexible distribution architecture and method for rake receiver of communication system, comprising: a plurality of processing units, further, each processing unit comprises: a plurality of rake receivers, wherein each rake receiver can receive a multi-path signal from its environment and, through a recovery process, outputs a recovered signal therefrom; an combiner, which connects with the plurality of rake receivers and receives a plurality of recovered signals, then further integrates the plural recovered signals which are originated from a same source by an integration process and, consequently, outputs an integrated signal therefrom; a master processing unit, which connects with the plural processing units and, through detecting the signal received, assigns an appropriate number of rake receivers to receive signals, and further the plural integrated signals originated from a same source are integrated by an integration process and, consequently, outputs a compound signal therefrom. The aforementioned rake receivers can be subordinated to different processing units. The present invention further provides a flexible distribution method for rake receivers that are subordinate to different processing units.

10 Claims, 4 Drawing Sheets

FLEXIBLE DISTRIBUTION DEVICE AND METHOD FOR RAKE RECEIVER OF COMMUNICATION SYSTEM

This Nonprovisional application claims priority under 35 U.S.C. § 119(a) on Patent Application No. 092112265 filed in TAIWAN on May 6, 2003, the entire contents of which are hereby incorporated by reference.

FIELD OF THE INVENTION

The present invention is related to a flexible distribution device and method for rake receiver, and more specifically, to a flexible distribution device and method for rake receiver that use a master processing unit to distribute rake receivers in order to increase hardware utilization.

BACKGROUND OF THE INVENTION

Following the progress of technology, cellular phone realizes a human desire of wireless communication and enables people to get rid of the constraint of corded phone. In addition to giving users more freedom, it shortens the distance between people.

However, when a radio signal being transmitted in space runs into obstacles, such as building, lake surface, glass, etc., certain phenomenon like reflection, refraction, diffraction, interference, etc. will happen that cause a signal to be received many times by a base station at different time. This kind of signal is called a multi-path signal. In addition to a deformation phenomena caused by jamming, multi-path signal exists a signal fading condition that it may be sometimes too fade to be recognized by base station. Therefore, the base station of the present invention employs rake receivers to receive multi-path signals in order to overcome the above problems.

Please refer to FIG. 1, which is a schematic diagram of the rake receiver 1 in a receiving system. As seen, a transmitted signal 10 received by an antenna 11 is transformed into an electrical signal by an input interface 12, then the signal passes through a filter 13, which is usually a band-pass filter, so as to filter out noises at high and low frequency, and afterward, it is sent to the processor 14 which might be a rake receiver. After transmitted signal 10 is radiated from a transmitting end, the signal is transmitted through multiple paths, and when it happen, different routing will have different arriving time. In timing fixer 15, delay estimation is implemented to find out several delay paths for multiple rake fingers. In phase fixer 16, phase rotation of signals is estimated to retrieve channel effect. Both timing fixer 15 and phase fixer 16 compensate the fading phenomenon. After processor 14 integrates all the received signals that has been corrected, a signal with better quality can be obtained. The signal with better quality further passes through a demodulation process of the decoder 17 and outputs therefrom a recovered signal for posterior circuit.

In the prior arts, a base station can be divided into several cells. Therefore, signals emitted by a user can be received not only by the cell where the user is located, but also by other cells. To improve quality of signal, it is also necessary to receive those signals with rake receiver 1. From aspect of the base station, a single user will require several sets of rake receiver 1 to receive signals correctly. However, when the signal quality is good enough, it causes waste of hardware. Please refer to FIG. 2, which is a diagram showing the rake receiver for base station according to the prior arts. As seen, a base station comprises a plurality of processing units 3 operating independently and a posterior circuit 8. The processing unit 3 further comprises a plurality of rake receivers 1, each can receiver a multi-path signal in its own circumstance which goes through a recovery process and outputs a recovered signal 19 therefrom; an combiner 2, which connects with the plurality of rake receivers and receives a plurality of recovered signals 19, then further integrates the plural recovered signals which are originated from a same source by an integration process and, consequently, outputs an integrated signal 29 therefrom to be used by a posterior circuit 8.

Take an example for detailed description that, when a user turns on its cellular phone, a preamble signal for initialization will be sent to a base station. The base station then, according to the preamble signal, assigns a processing unit 3 for receiving the preamble. For instance, when the environment is not good, five multi-path signals are generated accordingly. In order to have better efficiency, all five of the signals must be take into consideration simultaneously in the receiving end. Consequently, five rake receivers 1 are required for receiving signals, and a processing unit 3 capable of providing more than five rake receivers 1 is needed accordingly. However, in the prior art, each processing unit 3 is a hardware that does not support each other. That is, if every processing unit 3 contains more than five rake receivers 1, several idling rake receivers 1 will be wasted. On the other hand, if only five rake receivers 1 are installed while seven rake receivers 1 are needed actually for seven multi-path signals the efficiency of processing unit 3 will drop. Therefore, the number of rake receivers 1 within processing unit is a critical issue in design.

Moreover, in order to maintain a good communication quality, it is required to maintain a large amount of processing units in active state. In a long hour operation situation, processing unit is easy to malfunction and its lifespan is shorten, so that the cost of base station is increased. Hence, a new architecture is required to improve the above drawback.

SUMMARY OF THE INVENTION

The main objective of the present invention is to provide a flexible distribution device and method for rake receiver of communication system.

The secondary objective of the present invention is to provide a flexible distribution device and method for rake receiver of communication system that can avoid waste of hardware.

To accomplish the above objectives, the present invention provides a flexible distribution device for rake receiver, which is used in base station to distribute rake receivers, comprising:

a plurality of processing units comprising: a plurality of rake receivers, each can receive a multi-path signal in its own circumstance and, through a recovery process, outputs a recovered signal therefrom;

an combiner, which connects with the plurality of rake receivers and receives a plurality of recovered signals, then further integrates the plural recovered signals originated from a same source by an integration process and, consequently, outputs an integrated signal therefrom;

a detecting unit for detecting the signal received; and a master processing unit connected with the plural processing units for computing and assigning an appropriate number of rake receivers to receive multi-path signals based on the signal detected by the detecting unit, and the plural integrated signals originated from a same source is integrated by an integration process and, consequently, output a compound signal therefrom.

The present invention further provides a flexible distribution method for rake receiver, which comprises the following steps:

A: receiving the transmitted signal by a base station.

B: estimating a signature acknowledge number (SAN) by a master processing unit according to the quality of the transmitted signal received by processing units.

C: determining whether the total number of rake receivers within every currently operable processing units is enough according to the signature acknowledge number, if yes, then execute step E, if not, then execute step D.

D: adjusting the number of operating processing units according to the signature acknowledge number.

E: integrating the signals received by the operating rake receivers with the master processing unit and outputting a resulting compound signal to the posterior circuit. Repeat from step A.

DETAILED DESCRIPTION OF THE INVENTION

For your esteemed members of reviewing committee to further understand and recognize the objectives, the characteristics, and the functions of the invention, a detailed description in matching with corresponding drawings are presented as the following:

Please refer to FIG. 3, which is an architecture diagram according to the present invention. To reduce the waste of resource, an architecture used in base station for the distribution of the rake receiver 1 is provided according to the present invention, comprising: a plurality of processing units 3, which are used to receive multi-path signals from user's cellular phone, moreover, each processing unit 3 further comprising: a plurality of rake receivers 1, each can actually receives a multi-path signal from its environment and outputs a recovered signal 19 through an above-mentioned recovery process (including time and phase fixing); an combiner 2 which connects with the plurality of rake receivers 1 for receiving a plurality of recovered signals 19, then further integrates the plural recovered signals 19 originated from a same source by an integration process and, consequently, outputs an integrated signal 29 therefrom, wherein the integration process includes an equalization process for enhancing signals and thus, improving quality of signal; a detecting unit 31 which can be a matched filter and is used to filter the preamble signals and send out filtered signals as profiles.

A master processing unit 5, which connects with the plural processing units 3, and computes a signature acknowledge number (SAN) while the detecting units 31 within every processing unit 3 receive the preamble signal of mobile station initialization. The master processing unit collects all profiles from the detecting units 13 and estimates signature acknowledge number (SAN) by comparing the quality of the profiles. SAN is the number of rake receivers 1 needed to acquire signal with better quality, then an estimate arrangement is generated according to SAN to assign the rake receivers within the appropriate processing units 3 for receiving the multi-path signal from the cellular phone, further, the plural integrated signals 29 transmitted from the plural processing units 3 of a same source are integrated by an integration process again for signal enhancing, then the resulting compound signal 59 obtained is outputted to a posterior circuit 8, wherein the above-mentioned rake receivers 1 assigned by the estimate profile can be subordinated to different processing unit 3.

The master processing unit 5 further comprises: a distributor 51, which measures and compares the quality of the preamble signals acquired from detecting units 31 of processing units 3, such as magnitude of signal, error rate, etc., and computes SAN of the signal accordingly, where the SAN is used as a base for deciding the number of rake receivers needed, and further, according to the status of every processing unit 3, an estimate profile is computed for assigning the rake receivers, wherein the method of assigning is that: first, the rake receivers 1 of processing unit receiving signal of best quality are assigned, then if rake receivers 1 in one processing unit 3 are not enough, rake receivers 1 of other processing unit can be assigned thereafter. A master combiner 52, which connects with distributor 51 and combiners 2 within the plurality of processing units 3 and receives a plurality of integrated signals 29, then further the integrated signals 29 which are originated from a same source are integrated again according to distribution information, so that a compound signal is outputted therefrom to posterior circuit 8.

Please refer to FIG. 4, which is a flowchart of the present invention. Utilizing the foregoing architecture, a flexible distribution method for rake receiver 1 is provided according to the present invention, comprising the following processing steps:

Step 71~Receiving a transmitted signal of a mobile station, that is, while turning on a mobile station, a signal will be transmitted to base station to proceed with a transmission action.

Step 72~Computing a signature acknowledge number according to the quality of the transmitted signal received by every processing unit with the master processing unit. This step further comprise the following two steps to acquire necessary information,:

Evaluating quality of the transmitted signal received by every processing unit;

Arranging a selective sequence for selecting processing units according to quality of the transmitted signal the processing units received.

Step 73~determining whether the total number of rake receivers within every currently operable processing units is enough or not? If yes, then execute step 75, otherwise execute step 74; one of the initialization action of the base station is to distribute rake receivers for signal receiving, which first is to check whether the rake receivers currently operating are enough or not. The present step can be accomplished by the following:

D1: Determining a first parameter equal to the number of rake receivers that are provided by the first processing unit of the selective sequence.

D2: Checking whether the SAN is larger than the first parameter or not; if yes, then execute D3, otherwise execute D4;

D3: Selecting another processing unit according to the selective sequence, and add an other parameter with the number of rake receivers which can be provided by thereof; following by the execution of D2;

D4: Among the processing units selected, except the last processing unit of the selective sequence only employs the difference between the SAN and the master parameter as the number of rake receivers it provided, the other processing units selected provides all the rake receivers that it can provide.

Step 74~Adjusting the number of operating processing units according to SAN; making an appropriate adjustment according to SAN, that is, if there are no enough rake receivers, then activate those processing units 3 which are in the off state; if too many are on, than deactivate some processing units 3. In order to avoid the pin-pon phenomenon (deactivating right after activated, and activating right after deactivated) from happening, a certain tolerance is required for the on-off control of the processing units 3, and an estimate profile is generated for recording the state of distribution.

Step 75~Integrating the signals received by the operating rake receivers with the master processing unit 5 and then outputting the resulting signal to the posterior circuit. Repeat from step 71

For example, the present receiving system has three processing unit on a same circuit board which respectively are HW1, HW2 and HW3, and the number of rake receivers inside thereof are R1, R1 and R3 accordingly. When a signal from mobile station is received by base station, the detecting units within HW1, HW2 and HW3 will respectively transfer the signal received to master processing unit 5. Based on this transferred signal, the master processing unit 5 estimates that the multi-path signals from mobile station will require employing N signals as signature acknowledge number (SAN). Further, a selection sequence of HW1, HW2 and HW3 is made according to the quality of signals sent by thereof. In this embodiment, from good to worse, the qualities of signal are HW1, HW2 and HW3 successively.

While

1. N<R1, then activate N rake receivers within HW1 for signal receiving;
2. R1<N<R1+R2, then activate N rake receivers within HW1 and N−R1 rake receivers within HW2 for signal receiving;
3. R1+R2<N<R1+R2+R3, then activate every rake receivers within HW1 and HW2 and N−(R1+R2) rake receivers within HW3 for signal receiving;
4. N>R1+R2+R3, then activate every rake receivers within HW1, HW2 and HW3, in addition that searching other available rake receivers located on the other circuit board.

The receiving systems of base station are mostly modularized. That is, several processing units are usually set up on a same circuit board and are inserted in the system while the system is in need of expansion. The circuits are connected with each other by way of buses.

Thus, to improve the flexibility of hardware usage and further reduce the waste of hardware resource, the present invention uses a detection apparatus within processing unit to estimate SAN and dynamically adjusts the number of rake receivers needed accordingly, then further adjusts the operating processing units according to an actual measuring of signal, so that the number of rake receivers can best matches with the actual requirement. Consequently, the problem of insufficient amount of rake receivers within a single processing unit and the problem of rake receiver idling are solved, and therefore its hardware usage is at it optimal. Hence, the present invention indeed improves the drawbacks of the prior arts.

In summary that this invention has been disclosed and illustrated with reference to particular embodiments, the principles involved are susceptible for use in numerous other embodiments that will be apparent to persons skilled in the art. Consequently, the present invention has been examined to be progressive and has great potential in commercial applications.

Those skilled in the art should appreciate that they can readily use the disclosed conception and specific embodiments as a basis for designing or modifying other structures for carrying out the same purpose of the present invention, and that various changes, substitutions and alterations can be made herein without departing from the spirit and scope of the invention as defined by the append claims.

Figure 1:
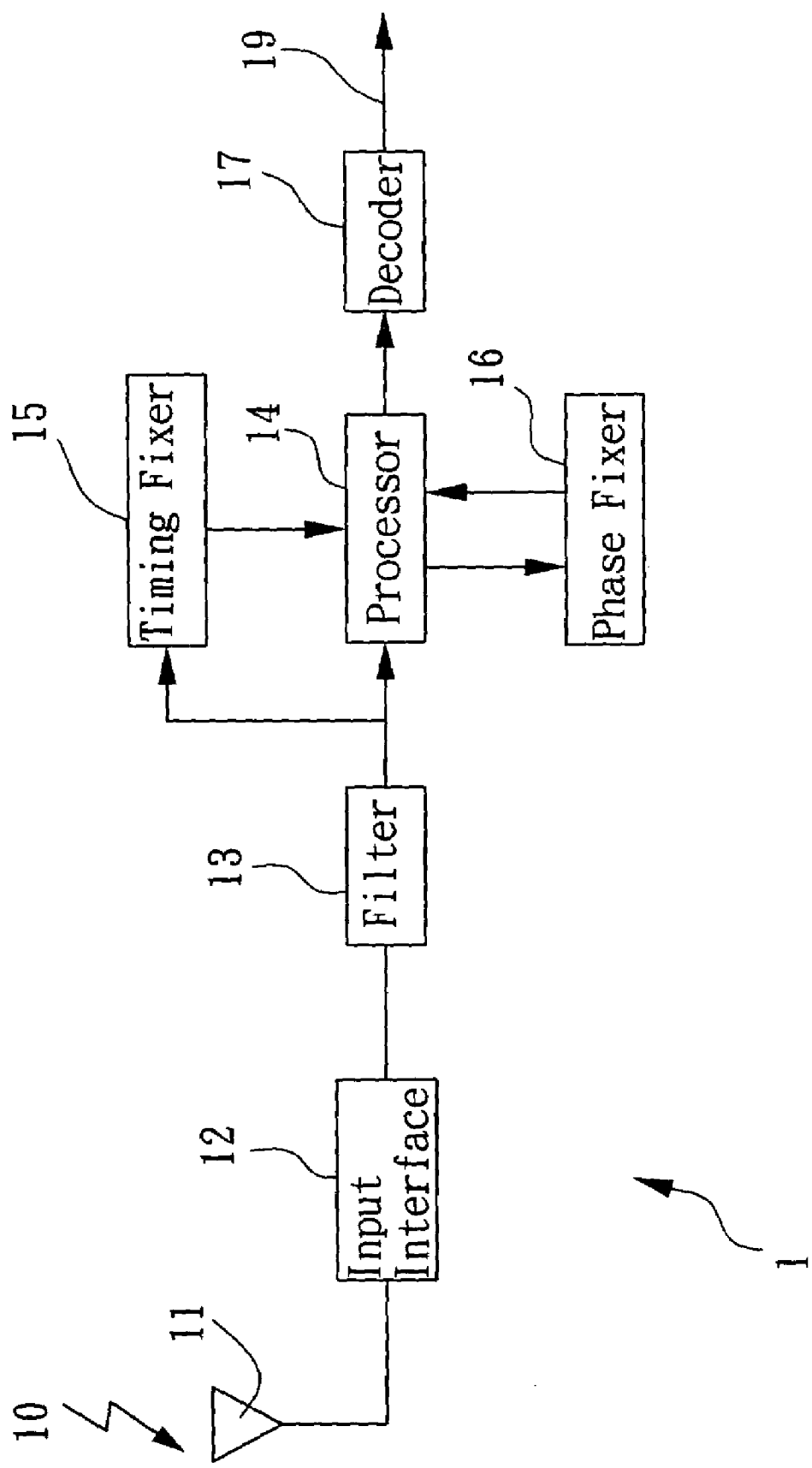
FIG. 1 is a schematic diagram for rake receiver.
Figure 2:
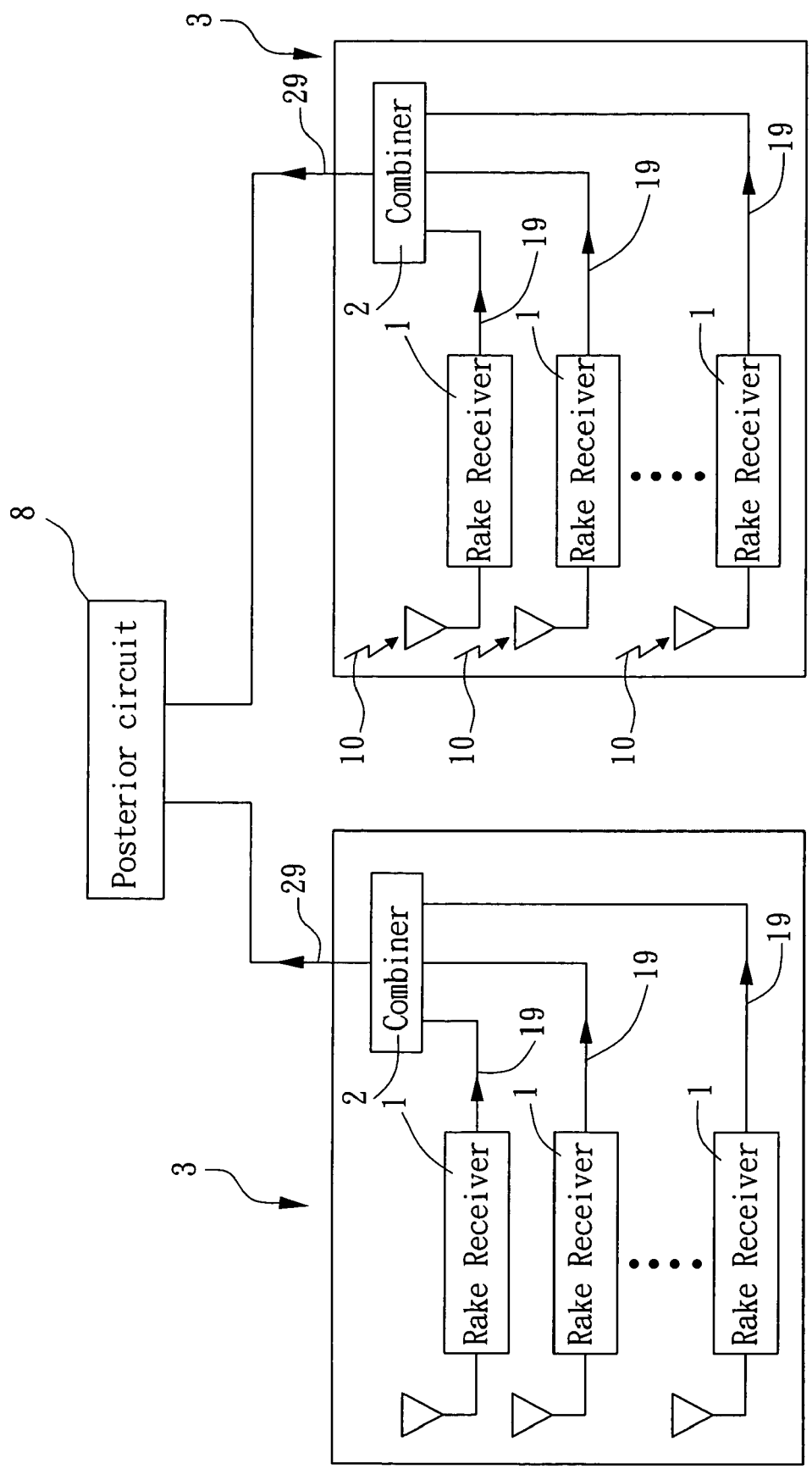
FIG. 2 is an diagram for rake receiver for base station according to the prior arts.
Figure 3:
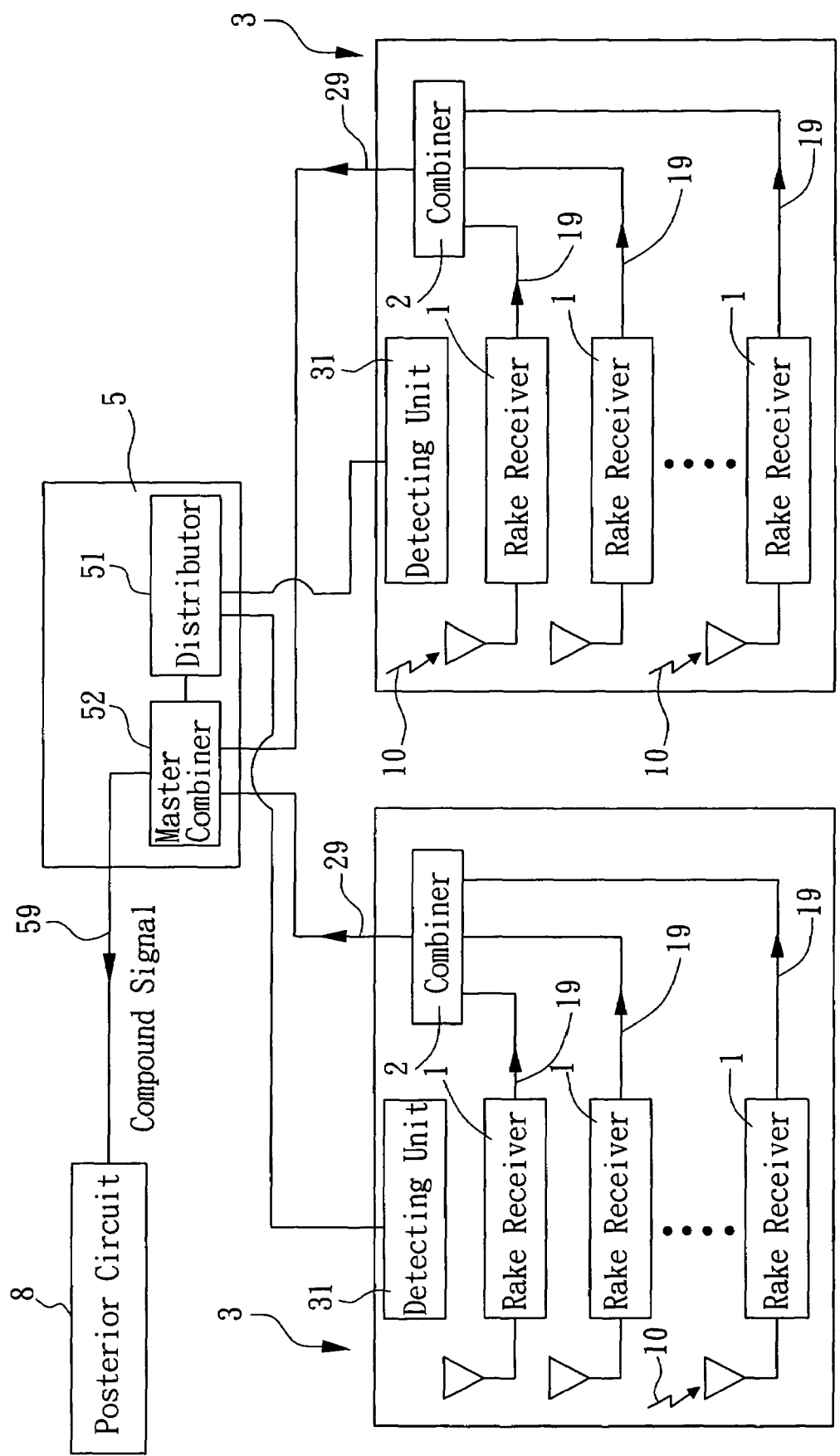
FIG. 3 is an architecture diagram according to the present invention
Figure 4:
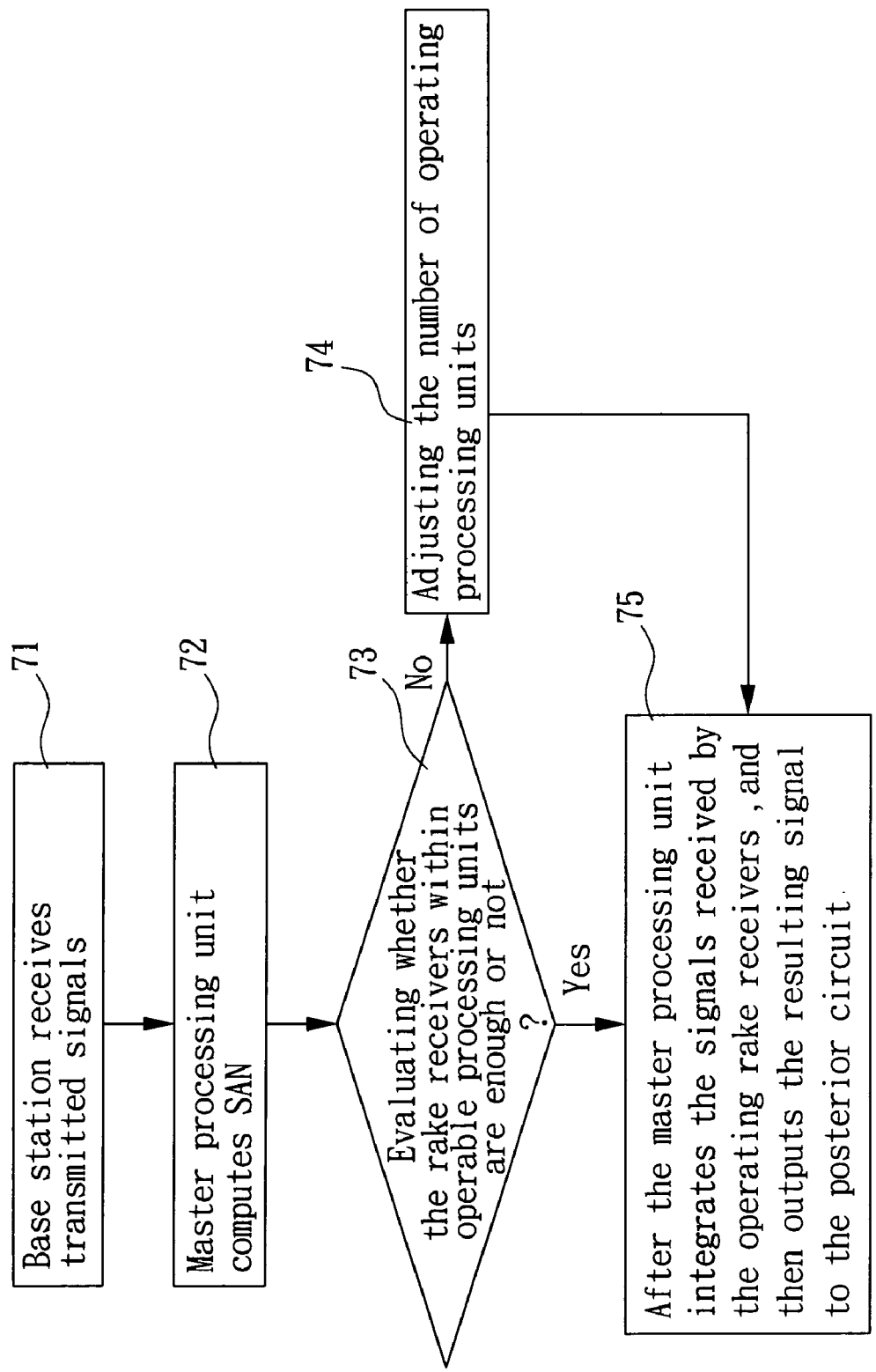
FIG. 4 is a flowchart according to the present invention.

What is claimed is:

1. A base station for receiving a transmitted signal from a mobile device, comprising:
   a master processing unit;
   a first processing unit connected with the master processing unit, comprising:
      a plurality of first rake receivers for receiving the transmitted signal; and
      a first detecting unit for receiving the transmitted signal and outputting a first detection signal; and
   a second processing unit connected with the master processing unit, comprising:
      a plurality of second rake receivers for receiving the transmitted signal; and
      a second detecting unit for receiving the transmitted signal and outputting a second detection signal, the quality of the first detection signal being larger than the quality of the second detection signal;
   wherein the master processing unit estimates a signature appropriate number (SAN) of rake receivers for receiving the transmitted signal according to the qualities of the first detection signals and the second detection signal and assigns the transmitted signal received by the second rake receivers when there are not enough first rake receivers in the first processing unit.

2. The base station of claim 1, the master processing unit further comprising:
   a distributor for receiving the first and second detection signals from the first and second processing units, and estimating SAN;
   a master combiner connected with the distributor and the plurality of processing units, the master combiner receiving a plurality of recovered signals of the first rake receivers and/or the second rake receivers and combining the recovered signals into a compound signal.

3. The base station of claim 2, wherein:
   the first processor, comprises R1 first rake receivers;
   the second processor, comprises R2 second rake receivers;
   wherein
   when SAN is smaller than R1, R1 of the first rake receivers are assigned for receiving the transmitted signal,
   when SAN is larger than R1, and smaller than (R1+R2), the R1 first rake receivers within the first processor and (SAN−R1) second rake receivers within the second processor are assigned for receiving the transmitted signal;

when SAN is larger than (R1+R2), the distributor searches rake receivers located within other processing units for assigning.

4. The base station of claim 2, wherein the distributor selects the first processing unit with high priority, the first processing unit having better quality of its detection signal.

5. The base station of claim 1, the first processing unit further comprises:
   a combiner connecting with the first rake receivers, the combiner receiving the recovered signals and integrating recovered signals which originated from the same source, then outputting to the master processing unit.

6. The base station of claim 1, wherein the first detecting unit is a matched filter.

7. A method for assigning rake receivers for a base station, the base station receiving a transmitted signal from a mobile station, and outputting a compound signal to a posterior circuit, the base station comprising a first processing unit, the first processing unit further comprising a plurality of first rake receivers, the second processing unit further comprising a plurality of second rake receivers, the method comprising:
   A: receiving the transmitted signal by the first processing unit and the second processing unit;
   B: estimating a signature acknowledge number (SAN) of rake receivers by the master processing unit according to the quality of the transmitted signals received by the first processing unit and the second processing unit, the transmitted signal quality received by the first processing unit being larger than the transmitted signal quality received by the second processing unit;
   C: assigning the transmitted signal received by the second rake receivers when there are not enough first rake receivers in the first processing unit.

8. The method of claim 7, wherein the SAN is related to quality of transmitted signals which are received by the processing units.

9. The method of claim 7, wherein the step B further comprising:
   B1: Evaluating quality of the transmitted signal received by the first processing unit and the second processing unit;
   B2: Arranging a sequence for selecting processing units according to quality of the transmitted signal received.

10. The method of claim 9, wherein said step D further comprises:
   D1: Determining a first parameter as the number of rake receivers that are provided by the first processing unit in said sequence,
   D2: Checking whether the SAN is larger than said first parameter or not; if yes, then execute D3, otherwise execute D4;
   D3: Selecting another processing unit according to said sequence, and add a second parameter with the number of rake receivers which can be provided by thereof; following by the execution of D2;
   D4: Among said processing units selected, only the last processing unit in the selective sequence employs the difference between the SAN and a master parameter as the number of rake receivers it provides, the other processing units being selected provide all the rake receivers that it can provide.

* * * * *